(12) United States Patent
Chernyak et al.

(10) Patent No.: US 6,480,891 B1
(45) Date of Patent: Nov. 12, 2002

(54) EMBEDDED CODE MEMORY SIZE REDUCTION IN ASYNCHRONOUS MODE TRANSFER DEVICES

(75) Inventors: Arcady Chernyak, Rosh-Ha'ain (IL); Haim Rochberger, Netanya (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/225,246

(22) Filed: Jan. 4, 1999

(51) Int. Cl.[7] ............................................... H04L 12/24
(52) U.S. Cl. ........................ 709/223; 717/178; 370/250
(58) Field of Search ................................. 717/174, 175, 717/176, 177, 178; 709/201, 202, 203, 223, 224; 700/1, 2, 3, 4, 5, 9, 108; 370/241, 250

(56) References Cited

U.S. PATENT DOCUMENTS

| | | | |
|---|---|---|---|
| 4,823,338 A | 4/1989 | Chan et al. ..................... 370/85 |
| 4,975,906 A | 12/1990 | Takiyasu et al. .......... 370/85.13 |
| 5,195,130 A | * 3/1993 | Weiss et al. ............ 379/110.01 |
| 5,214,646 A | 5/1993 | Yacoby .................... 370/85.14 |
| 5,280,476 A | 1/1994 | Kojima et al. ............. 370/60.1 |
| 5,280,481 A | 1/1994 | Chang et al. ............ 370/85.13 |
| 5,315,582 A | 5/1994 | Morizono et al. ............ 370/16 |
| 5,321,693 A | 6/1994 | Perlman ................... 370/85.13 |
| 5,321,694 A | 6/1994 | Chang et al. ............ 370/85.13 |
| 5,329,527 A | 7/1994 | Ujihashi et al. ......... 370/85.13 |
| 5,329,619 A | 7/1994 | Page et al. ................... 395/200 |
| 5,345,558 A | 9/1994 | Opher et al. ................ 395/200 |
| 5,347,632 A | * 9/1994 | Filepp et al. ................ 709/202 |
| 5,390,184 A | 2/1995 | Morris ....................... 370/94.2 |
| 5,394,402 A | 2/1995 | Ross ......................... 370/94.1 |
| 5,408,469 A | 4/1995 | Opher et al. ................ 370/60.1 |
| 5,444,702 A | 8/1995 | Burnett et al. ............. 370/60.1 |
| 5,483,536 A | 1/1996 | Gunji et al. ............. 370/85.14 |
| 5,519,704 A | 5/1996 | Farinacci et al. ......... 370/85.13 |
| 5,548,646 A | 8/1996 | Aziz et al. ..................... 380/23 |
| 5,548,723 A | 8/1996 | Pettus .................... 395/200.01 |
| 5,550,816 A | 8/1996 | Hardwick et al. ............. 370/60 |
| 5,550,818 A | 8/1996 | Brackett et al. .............. 370/60 |
| 5,566,014 A | 10/1996 | Glance ........................ 359/124 |
| 5,583,865 A | 12/1996 | Esaki et al. .................. 370/397 |
| 5,600,644 A | 2/1997 | Chang et al. ................ 370/404 |
| 5,633,869 A | 5/1997 | Burnett et al. .............. 370/396 |
| 5,659,542 A | 8/1997 | Bell et al. .................... 370/496 |
| 5,666,487 A | 9/1997 | Goodman et al. ...... 395/200.76 |
| 5,668,798 A | 9/1997 | Toubol et al. ............... 370/230 |
| 5,790,753 A | * 8/1998 | Krishnamoorthy et al. . 348/461 |

(List continued on next page.)

FOREIGN PATENT DOCUMENTS

| | | | |
|---|---|---|---|
| EP | 685723 A2 | * 12/1995 | .......... G01M/15/00 |
| WO | WO97/04386 | 2/1997 | ............ G06F/9/455 |
| WO | WO98/02821 | 1/1998 | ........... G06F/13/00 |

OTHER PUBLICATIONS

Simpson, W., "IP in IP Tunneling", Request for Comments #153, Oct. 1995, 9 pages.

(List continued on next page.)

Primary Examiner—Dung C. Dinh
(74) Attorney, Agent, or Firm—Howard Zaretsky

(57) ABSTRACT

A system for reducing the memory requirements of an ATM device utilizing one or more temporary code uploads to bring needed portions of application code into the memory of the ATM embedded system on a temporary basis. The present invention functions to divide the code necessary for operation of the ATM device into two categories: (1) application code that is seldom used or code used only once and (2) all other application code. The application code that is seldom used or used only once is removed from the memory of the ATM embedded system and placed in a software storage device external to the system. This serves to significantly reduce the memory requirements of the ATM device, by as much as 40% in come cases depending on the size of the application code portions.

6 Claims, 4 Drawing Sheets

U.S. PATENT DOCUMENTS

| | | | |
|---|---|---|---|
| 5,881,115 A | * 3/1999 | Lipner et al. | 376/216 |
| 5,974,466 A | 10/1999 | Mizutani et al. | 709/236 |
| 6,067,582 A | * 5/2000 | Smith et al. | 709/203 |
| 6,269,371 B1 | * 7/2001 | Ohnishi | 707/1 |
| 6,282,715 B1 | * 8/2001 | Barraud | 725/117 |
| 6,308,325 B1 | * 10/2001 | Dobbek | 717/178 |
| 6,362,836 B1 | * 3/2002 | Shaw et al. | 345/744 |

OTHER PUBLICATIONS

Swallow, G., "Frame Relay PVC Multicast Service and Protocol Description", FRF.7, Frame Relay Forum Implementation Agreement, Oct. 21, 1994, printed from internet site www.frforum.com, 17 pages.

Cisco—"Packet Services", printed from website http://www.cisco.com/warp/public/732/Tech/pksrv–tc.html, 32 pages, Dec. 1995.

Deering, S., "Host Extensions for IP Multicasting", Request for Comments (RFC) 1112, Stanford University, 16 pages, Aug. 1989.

Egevang, K. et al., "The IP Network Address Translator (NAT)", Request for Comments (RFC) 1631, Cray Communications, 12 pages, May 1994.

"All About . . . Multicast Wide Area Network Services", printed from website http://www.starburstcom.com/mcast.html, 11 pages, Feb. 1997.

Ellington, B. (Ed.), LAN Emulation SWG Drafting Group, "LAN Emulation Over ATM Specification—Version 1.0", ATM Forum, pp. 1–139, (1995).

Novell NetWare Network Computing Products 3.12, "NetWare 3.12 Concepts", Novell, Inc., USA, Part No.: 100–001715–001, Jul. 1993, pp. 158–163.

Novell NetWare Network Computing Products 3.12, "TCP/IP Transport Supervisor's Guide", Novell, Inc., USA, Part No. 100–001866–001, May 1993, pp. B–15—B–22.

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

* cited by examiner

EMBEDDED CODE MEMORY SIZE REDUCTION IN ASYNCHRONOUS MODE TRANSFER DEVICES

FIELD OF THE INVENTION

The present invention relates generally to data communications and more particularly relates to a method of reducing the size of code memory required in embedded systems such as ATM devices.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

Embedded Systems and Code Memory Size

Currently, most ATM devices, e.g., switches, edge devices, etc., comprise embedded systems with a limited amount of memory and processing facilities. These systems typically incorporate multiple types of memory. Two types of memory that are present in most of these systems include RAM, e.g., static, dynamic, etc., and NVRAM, e.g., EEPROM, EPROM, Flash, etc. The RAM portion typically holds program application code and data while the NVRAM portion typically holds device configuration data and application code.

One of the major and often critical resources of an embedded system is the size of the memory, i.e., ROM (non-volatile) and RAM (volatile), which is primarily used to store program code. As the functionality of modem ATM equipment is constantly expanding, the corresponding code size expands along with it. This, however, is pitched against the desire to keep the cost and complexity of products as low as possible. Although the cost semiconductor memory steadily drops over time, the memory portion of ATM devices can potentially be significant.

A block diagram illustrating a prior art ATM device coupled to a management device is shown in FIG. 1. The management/control device 12 is coupled to the ATM embedded system 14 which represents any type of ATM device such as a switch or edge device. For the majority of the time the ATM embedded system operates on its own with no intervention required from a user or external device. There are times, however, when it is necessary to perform maintenance or administration operations on the ATM device. To accomplish this, the management/control device 12 is connected to the ATM device, such as via a front panel RS-232 serial connection. The software in the management device sends requests to the ATM system which processes the request and replies with a response.

It is important to note that all the software code that the ATM system needs is incorporated within its memory. This is regardless of the frequency of execution of any particular portion of software application code. Thus, the system is oblivious to the fact that some code is used over and over on a very frequent basis or whether a portion of application software code is used seldom, only once or not at all. Not all the application software code, however, of the embedded system is used all the time. A significant part of the code is used only once during the lifetime of the system.

An example of application code that is used seldom or one time only is conversion software that converts device configuration data from one version to another, such as after a software upgrade. Another example is the user interface and interactive user dialog software that permits a user, e.g., network administrator, to communicate with and configure the ATM device. The ATM embedded device must incorporate all the software required to perform this task, regardless of the low frequency of its use.

SUMMARY OF THE INVENTION

The present invention is a system for reducing the memory requirements of an ATM device by utilizing one or more temporary code uploads to bring needed portions of application code into memory of the ATM embedded system on a temporary basis. The present invention functions to divide the entire code necessary for operation of the ATM device into at least two categories: (1) application code that is seldom used or code used only once and (2) all other application code. The application code that is seldom used or used only once is removed from the memory of the ATM embedded system and placed in a device external to the system. This serves to significantly reduce the memory requirements of the ATM device, such as by up to 40% in come cases depending on the size of the various code portions.

Examples of seldom used or only once used software include configuration conversion software for version updating; local management software (excluding SNMP software); and debugging and testing software.

In a first embodiment, the seldom or once only used application software for the ATM embedded system is stored on a separate external software server. A plurality of application code portions are stored in the memory of the software server. Requests from the LMA device trigger a request for application code from the ATM device to the software server. The requested code is uploaded to the ATM device and execution continues. A request is generated and sent to the LMA device.

In a second embodiment, the LMA device and the software server are implemented on the same machine. In a third embodiment, a plurality of software servers are distributed throughout the network. The LMA device may or may not be combined with a software server. In either case, the ATM device requests an application code portion from any of the software servers available to it in the network.

There is provided in accordance with the present invention, in an Asynchronous Transfer Mode (ATM) network including at least one ATM embedded device and at least one local management and administration (LMA) device, a method of reducing the code related memory requirements of the ATM device, the method comprising the steps of removing seldom used or once used application code from the ATM device and storing it on an external software server, receiving a request from the LMA device by the ATM device which requires the execution of application code located in the software server, generating and sending a code request from the ATM device to the software server corresponding to application code needed on the ATM device, uploading the application code from the software server to the ATM device, executing the application code on the ATM device and generating and sending a response from the ATM device to the LMA device.

The network includes a plurality of distributed software servers and the step of generating and sending the code request comprises the step of generating and sending the code request to one of the plurality of distributed software servers. In addition, the LMA device and the software server can be implemented on the same machine. The application code stored on the software server can comprise configuration conversion software for version updating, local management software or debug and test software.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| CCITT | Comite Consulatif International Telegraphique et Telephonique |
| EEPROM | Electrically Erasable Programmable Read Only Memory |
| EPROM | Erasable Programmable Read Only Memory |
| FDDI | Fiber Distributed Data Interface |
| ITU | International Telecommunications Union |
| LAN | Local Area Network |
| LMA | Local Management and Administration |
| NVRAM | Non-Volatile Random Access Memory |
| PC | Personal Computer |
| RAM | Random Access Memory |
| ROM | Read Only Memory |
| SNMP | Simple Network Management Protocol |
| TCP/IP | Transport Control Protocol/Internet Protocol |
| UNI | User to Network Interface |
| WAN | Wide Area Network |

General Description

The present invention is a system for reducing the memory requirements of an ATM device by utilizing one or more temporary code uploads to bring needed portions of application code into memory of the ATM embedded system on a temporary basis. The present invention functions to divide the application software code necessary for operation of the ATM device into at least two categories: (1) application code that is seldom used or code used only once and (2) all other application code. The application code that is seldom used or used only once is removed from the memory of the ATM embedded system and placed in a device external to the system. This serves to significantly reduce the memory requirements of the ATM device, by as mcuh as 30% in come cases depending on the size of the various application code portions.

Examples of seldom used or only once used software include configuration conversion software for version updating; local management software (excluding SNMP software); and debugging and testing software.

Figure 1:
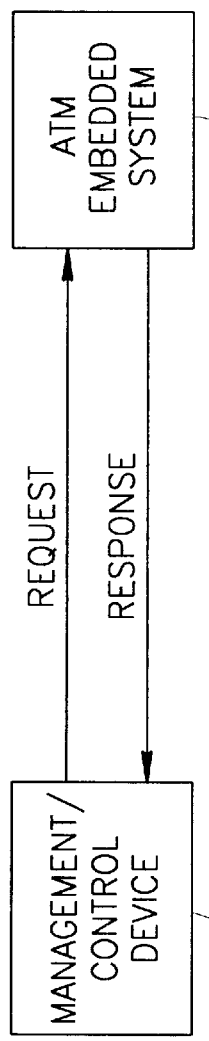
FIG. 1 is a block diagram illustrating a prior art ATM device coupled to a management device.
Figure 2:
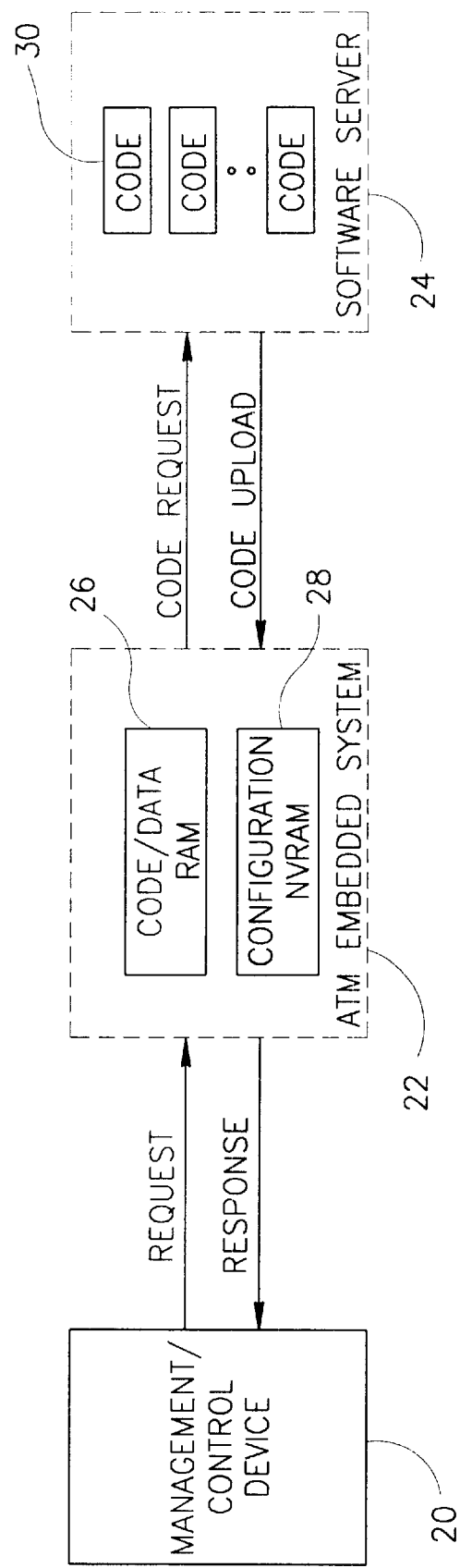
FIG. 2 is a block diagram illustrating a first embodiment of an ATM embedded system and software server of the present invention.

A block diagram illustrating a first embodiment of an ATM embedded system and software server of the present invention is shown in FIG. 2. In this first embodiment, the seldom or once only used application software for the ATM embedded system 22 is stored on a software server 24. The plurality of application code portions 30 are stored in the memory of the software server 24.

The ATM embedded system 22 comprises a volatile memory portion 26, e.g., RAM, and a non-volatile memory portion 28, e.g., NVRAM, EEPROM, etc. The RAM portion 26 stores the frequently used application code and associated data for the normal execution of the ATM system. The NVRAM portion 28 functions to store the frequently used application code and device configuration. Note that the application code may be stored in compressed form in the NVRAM to save memory space.

A management and control device 20 that functions to perform local management and administration (LMA) is coupled to the ATM embedded system 22 for maintenance and administrative purposes. In operation, the management device 20 generates and sends a request to the ATM embedded system 22 which processes the request in accordance thereto. The request may require the execution of code that is not present in the system 22 if the request is for seldom performed functions such as device configuration conversion. In response to the request, the ATM device 22 generates and sends an application code request to the software server 24. The software server 24 is accessible to the ATM device via a communication network such as a LAN, WAN, Internet, etc.

In response to the code request, the software server responds with the requested code portion 30 and uploads it to the ATM device 22. All the necessary software required to fulfill the request is sent to and installed in the RAM memory of the ATM embedded system. The ATM device 22 receives the application code portion and places it in its RAM memory for immediate execution. Once execution is complete, the ATM device generates and sends a response to the management device 20. Optionally, once execution is complete, the application code portion that was temporarily uploaded and installed in the ATM device can be deleted or kept in memory for a predetermined period of time, to satisfy requests that may arrive in the near future.

Figure 3:
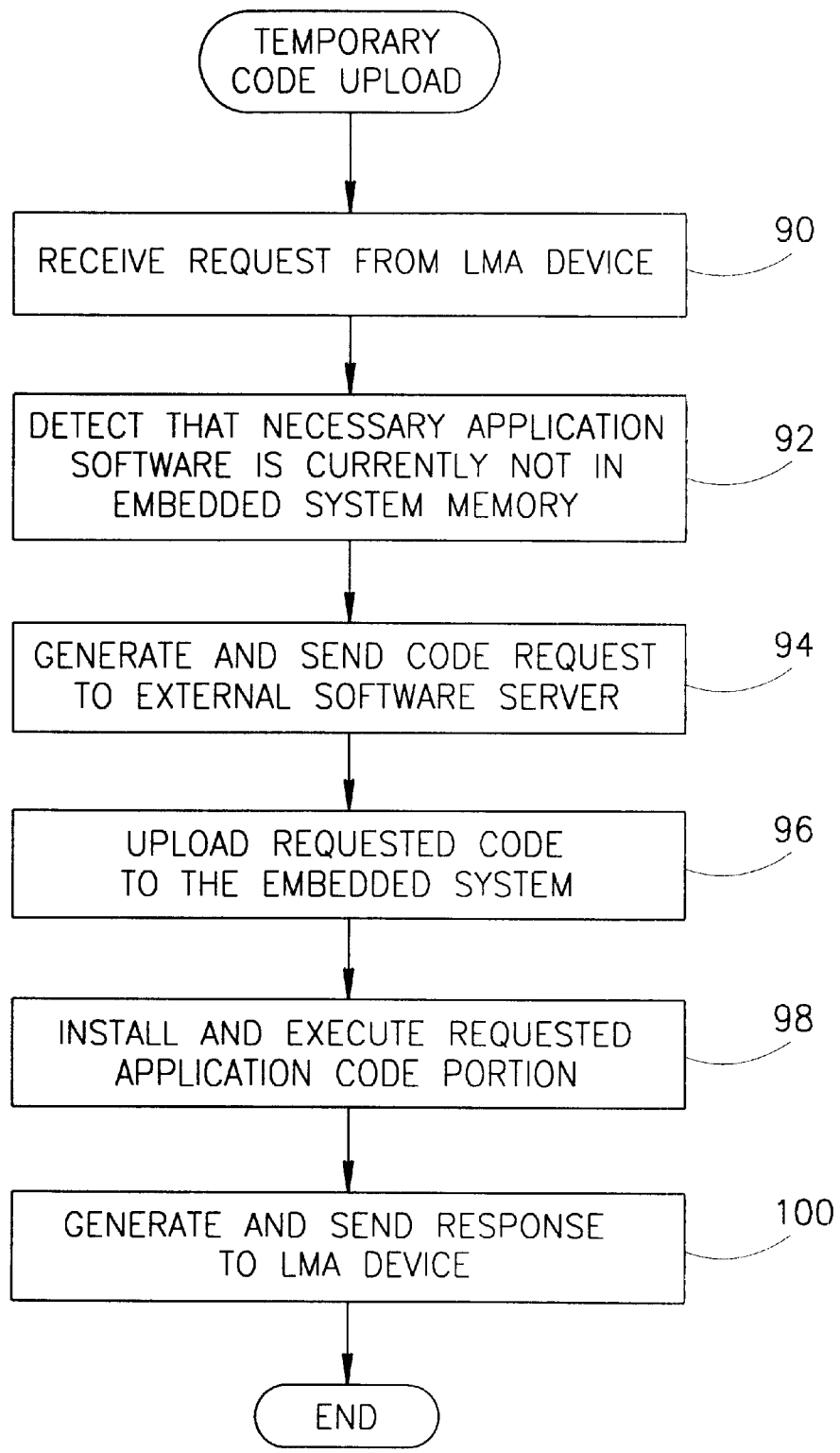
FIG. 3 is a flow diagram illustrating the temporary code upload method of the present invention.

A flow diagram illustrating the temporary code upload method of the present invention is shown in FIG. 3. In the first step, the embedded system receives the request generated by the LMA or management device (step 90). In response thereto, the ATM embedded system determines that the request received requires one or more application code portions that are not currently present in its memory (step 92). The embedded system generates and sends an application code request to the external software server (step 94). In response thereto, the software server uploads one or more application code portions to the embedded system (step 96).

Once the embedded system receives the application code portions, it installs the software in its RAM and begins execution of the code (step 98). As a result of the completion of the operation, the embedded system generates and sends a response back to the LMA device (step 100).

In implementing the above method, a list of the various requests can be determined and coded as external functions. These functions are compiled separately and stored as external files on the software server. During the linking stage, references to these external functions are resolved formally via the use of empty function stubs.

Another implementation approach is based on an algorithm for starting operation of the embedded system and various software services, i.e., the software server. At the time of system start-up, the embedded system searches and attempts to find the host which responds to a 'request to bind' message. To search for the host, any of the well known network protocols can be used including but not limited to TCP/IP, IPX/SPX, NetBios, etc. The configuration information containing names of the software server(s) is used during the binding process of the embedded system.

An exchange of the function name list is made after establishing a connection between the ATM embedded system and the software server. After the exchange occurs, the ATM embedded system and the software server send 'keep alive' messages (packets) to each other or use one of the well known protocol services for monitoring of the connection. If the connection fails, the embedded system attempts to either re-establish connection to the software server or attempts to find other software servers from the software server configuration list.

Note that the software server nearest the ATM embedded system does not necessarily have to maintain all the necessary code functions required by all systems stored in its local storage. A plurality of software servers can be connected and linked together. Thus, application code requests may be redirected from one software server to another.

As stated above, the ATM embedded system functions to detect a request from the LMA device that requires application code that is stored externally. The global resource name can be used to send a code request to the nearest software server. The embedded system generates and sends a response to the LMA only after receiving and executing the missing application code.

Figure 4:
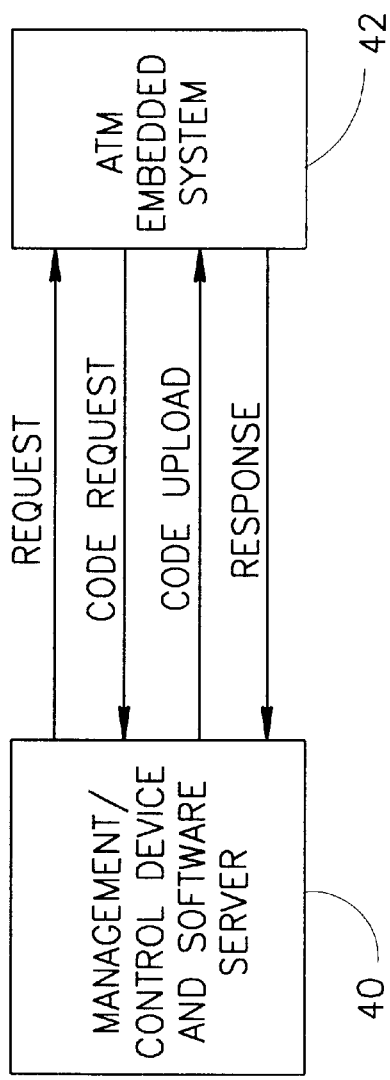
FIG. 4 is a block diagram illustrating a second embodiment of an ATM embedded system and combination management device and software server of the present invention.

A second embodiment of the present invention simplifies the system by implementing the software server functions and the LMA functions within the same device. A block diagram illustrating a second embodiment of an ATM embedded system and combination management device and software server of the present invention is shown in FIG. 4. In this second embodiment, the LMA management/control device and the software server are implemented in the same module (device) 40. Note that in this and all the other embodiments, the LMA device and the software server can be implemented on a personal computer (PC) or equivalent.

In operation, the LMA/control system and software server 40 generates a request to the ATM embedded system 42. The embedded system 42, in turn, detects that the necessary software code is not present in the system and thus generates a code request that it sends to the software server module 40. The software server sends the requested application code portion to the embedded system 42. The application code is then installed on the embedded system and executed and a response generated which is sent back to the LMA/control device 40.

Figure 5:
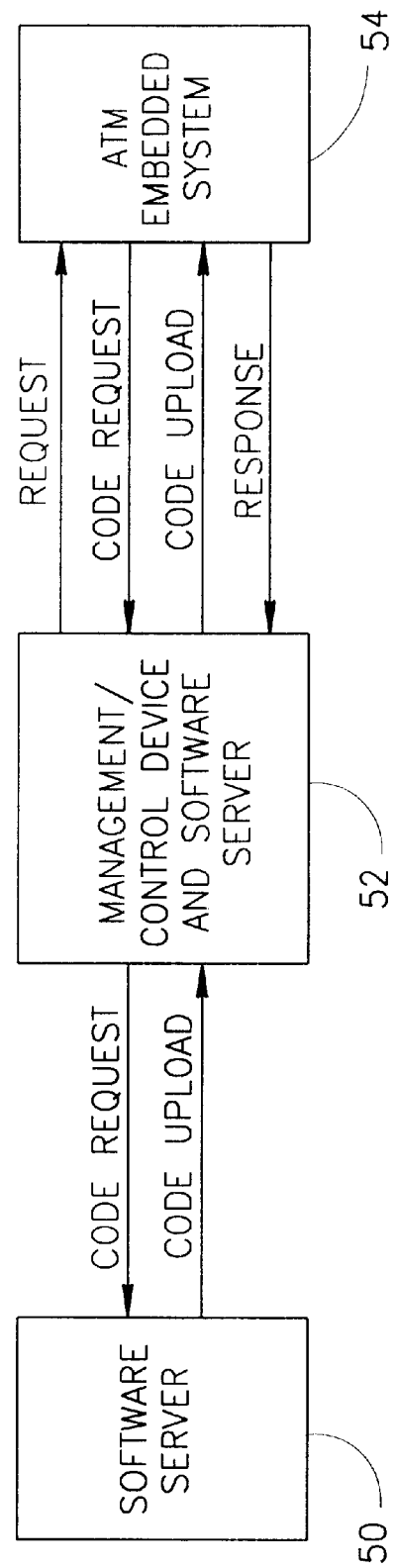
FIG. 5 is a block diagram illustrating a third embodiment of an ATM embedded system and combination management device and software server of the present invention.

In a third embodiment, the software server function is distributed over multiple devices. In other words, the application code that is seldom used or used once is stored on one or more machines. A block diagram illustrating a third embodiment of an ATM embedded system and combination management device and software server of the present invention is shown in FIG. 5. As an example, only two software servers are shown, one stand alone server 50 and a second software server combined with the LMA/control device 52. The request, code request, code upload and response interaction between the LMA/software server 52 and the ATM embedded system 54 function similarly to that of the second embodiment of FIG. 4, with one difference. The difference being that the code request from the ATM embedded system 54 may trigger a code request to be generated and sent by the LMA/control device 52 to a software server 50 that is external to itself.

The software server 50 responds to the code request with the requested application code portion and sends it or uploads it to the LMA/control device 52. Once received, the LMA/control device forwards the application code request to the ATM embedded system 54 for execution thereon.

Figure 6:
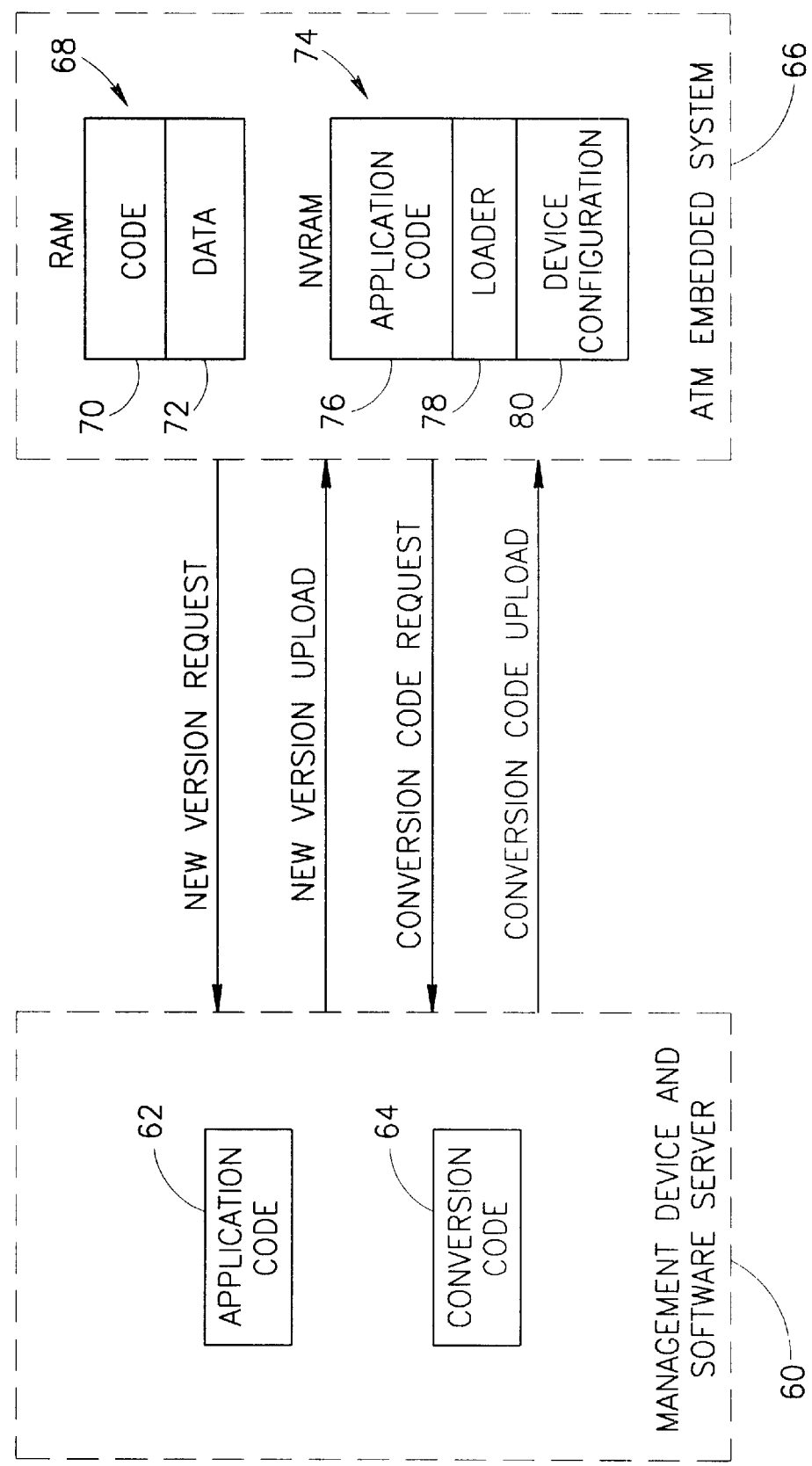
FIG. 6 is a block diagram illustrating an example of the second embodiment of the present invention in more detail.

An illustrative example of the temporary code upload method of the present invention will now be presented within the context of a software upgrade procedure that is performed on an ATM embedded device, e.g., a switch. A block diagram illustrating an example of the second embodiment of the present invention in more detail is shown in FIG. 6. The LMA device/software server 60 is coupled to the ATM embedded system 66. The memory of the software server 60 comprises the entire application code 62 for the frequently used portions of the embedded device and a plurality of seldom or once only used code portions 64, one of which is shown that functions to convert device configuration data from an outdated version to the current version.

The memory of the ATM embedded system 66 comprises a volatile (RAM) portion 68 containing application code 70 and data 72 and a non-volatile (NVRAM) portion 74 containing application 76 (possibly in compressed format), a loader 78 and device configuration data 80.

Normally, upon start up of the ATM embedded device, the loader is read from NVRAM into RAM and executed. The loader functions to read the application code from NVRAM 74, decompress it if necessary, and write it into the RAM 68.

In this example, the application software 76 within the ATM embedded system 66 is to be upgraded to a new version. The image of the configuration data in the device configuration portion 80 of the NVRAM is dependent on the software version currently in use. An application program is used to convert the old image, i.e., flash image, to the new one. This application software, however, is used only once during the lifetime of the ATM device.

In operation, a network administrator or other personnel triggers an upgrade of the application code 76 in the NVRAM portion 74 of the ATM device 66. The application code 62 of the new version resides on the software server 60. The new version of software is uploaded and installed in the application code 76 of the NVRAM.

When the device is rebooted, the loader 78 reads the code image into RAM and execution begins. The code detects that a new version of the software is running since the version stamp of the device configuration 80 corresponds to an older version. The software thus detects that an old flash image is stored in NVRAM and, since the conversion code is not in the ATM device, it generates and sends a conversion code request to the software server 60. In this example, the software server is the same machine, i.e., PC, as the LMA device.

In response to the code request, the software server 60 uploads the conversion code function 64 to the ATM device 66. The conversion application code functions to update the NVRAM 74, e.g., flash memory, in accordance with the current software version. Once the conversion is complete, the external conversion software function is deleted from RAM memory thus permitting the space to be used for other purposes.

Using the temporary code upload method of the present invention, memory requirements for code storage can be decreased, depending on the system, from 20 to 40% while preserving the original functionality. The memory freed up can be dynamically reorganized and utilized for other purposes such as to improve the efficiency of the embedded system without incurring cost increases or the requirement for additional resources.

In an alternative embodiment, overlay techniques, well known to those skilled in the software arts, can also be used to externally store application code software functions that are seldom used or used once in the ATM device. Using this technique, only one of the multiple overlays making up the software application is present in memory at any one time. In response to requests from the LMA or other device, the ATM device requests different overlays from the software server. The appropriate overlay is uploaded to the ATM device and execution continues and a response is generated and sent back to the LMA device.

While the invention has been described with respect to a limited number of embodiments, it will be appreciated that many variations, modifications and other applications of the invention may be made.

What is claimed is:

1. In an Asynchronous Transfer Mode (ATM) network including at least one ATM embedded device and at least one local management and administration (LMA) device, a method of reducing the code related memory requirements of said ATM device, said method comprising the steps of:

removing seldom used or once used application code from said ATM device and storing it on an external software server;

receiving a request from said LMA device by said ATM device which requires the execution of application code located in said software server;

generating and sending a code request from said ATM device to said software server corresponding to application code needed on said ATM device;

uploading said application code from said software server to said ATM device;

executing said application code on said ATM device; and generating and sending a response from said ATM device to said LMA device.

2. The method according to claim 1, wherein said network comprises a plurality of distributed software servers and said step of generating and sending said code request comprises the step of generating and sending said code request to one of said plurality of distributed software servers.

3. The method according to claim 1, wherein said LMA device and said software server are implemented on the same machine.

4. The method according to claim 1, wherein said application code stored on said software server comprises configuration conversion software for version updating.

5. The method according to claim 1, wherein said application code stored on said software server comprises local management software.

6. The method according to claim 1, wherein said application code stored on said software server comprises debug and test software.

* * * * *